United States Patent [19]
Hara et al.

[11] Patent Number: 5,602,637
[45] Date of Patent: Feb. 11, 1997

[54] COLOR PRINTER

[75] Inventors: Kei Hara, Shizuoka-ken; Hiroshi Yamaguchi, Numazu, both of Japan

[73] Assignee: Kabushiki Kaisha TEC, Tokyo, Japan

[21] Appl. No.: 557,465

[22] Filed: Nov. 14, 1995

[30] Foreign Application Priority Data

Nov. 17, 1994 [JP] Japan .................................. 6-283091

[51] Int. Cl.$^6$ .................................................. G03G 15/01
[52] U.S. Cl. ............................ 399/223; 399/51; 399/58; 399/72
[58] Field of Search ..................................... 355/200, 203, 355/208, 210, 245, 246, 326 R, 327; 118/645; 395/117

[56] References Cited

U.S. PATENT DOCUMENTS

| | | | |
|---|---|---|---|
| 4,853,738 | 8/1989 | Rushing | 355/327 |
| 5,075,725 | 12/1991 | Rushing et al. | 355/208 |
| 5,404,203 | 4/1995 | Kinoshita et al. | 355/208 |
| 5,483,625 | 1/1996 | Robertson et al. | 395/117 |

FOREIGN PATENT DOCUMENTS

| | | |
|---|---|---|
| 61-143776 | 7/1986 | Japan . |
| 4-25865 | 1/1992 | Japan . |
| 4-56946 | 2/1992 | Japan . |

*Primary Examiner*—Sandra L. Brase
*Attorney, Agent, or Firm*—Frishauf, Holtz, Goodman, Langer & Chick

[57] ABSTRACT

A color printer includes an electrophotographic process unit for selectively exposing the photosensitive image carriers to form identical latent images thereon, developing the latent images as toner images by supplying toners of different colors, and transferring the toner images onto paper, and a control circuit for controlling amounts of exposure of the latent images to be formed by the electrophotographic process unit. Particularly, the control circuit includes a toner-save key for selecting a toner-save mode, and processing circuit for lowering the exposure amounts of the latent images in the toner-save mode, while changing a rate of the exposure amounts to compensate for a difference between development properties of the toners.

10 Claims, 6 Drawing Sheets

| DATA COLOR | NORMAL MODE DATA | TONER-SAVE MODE DATA |
|---|---|---|
| YELLOW (Y) | Pny | Py |
| CYAN (C) | Pnc | Pc |
| MAGENTA (M) | Pnm | Pm |
| BLACK (BK) | Pnbk | Pbk |

| DATA COLOR | NORMAL MODE DATA | TONER-SAVE MODE DATA (M1-M6) | | | | | |
|---|---|---|---|---|---|---|---|
| | | M1 | M2 | M3 | M4 | M5 | M6 |
| YELLOW (Y) | Pny | Py1 | Py1 | Py1 | Py2 | Py1 | Py2 |
| CYAN (C) | Pnc | Pc1 | Pc1 | Pc2 | Pc3 | Pc3 | Pc4 |
| MAGENTA (M) | Pnm | Pm1 | Pm2 | Pm3 | Pm4 | Pm3 | Pm2 |
| BLACK (BK) | Pnbk | Pbk5 | Pbk5 | Pbk5 | Pbk5 | Pbk4 | Pbk3 |

COLOR PRINTER

BACKGROUND OF THE INVENTION

1. Field of the Invention

This invention generally relates to a color printer for printing color images by using the electrophotographic process, and more particularly to a color printer in which toners of different colors are used for printing.

2. Description of the Related Art

In a typical color printer, for example, first to fourth printing units are arranged on the paper feeding path to print the same image in different colors such as yellow, cyan, magenta and black. In each of the printing units, an image carrier is uniformly charged and the image carrier surface is scanned by an exposure beam so as to form an electrostatic latent image on the image carrier and then toner of a corresponding color is supplied to the image carrier to develop the electrostatic latent image as a toner image. The paper is fed along the paper feeding path to be sequentially supplied to the first to fourth printing units. Each of the printing units transfers the toner image on the same area of the paper supplied thereto. Thus, a color image will be formed by combining the toner images of yellow, cyan, magenta and black by the time the paper passes all of the first to fourth printing units and is discharged.

The first to fourth printing units are generally formed with the same structure so as not to cause a variation in the printing quality and perform the printing operation on the same process condition. For this reason, for example, the charging voltages are set to the same values in the respective printing units. Further, as the toners of different colors, materials capable of permitting a sharpest color image to be produced on the above process condition are selected.

In a case where a large number of color images are to be printed but only a small amount of toner remains, it is sometimes required to suppress the consumption of toner without seriously thinking that the printing concentration becomes low. If the amount of toner becomes insufficient during the printing operation, it becomes necessary to interrupt the printing operation and quickly replace the toner packs. In this case, the above replacing operation can be effected only when a spare toner pack is prepared at hand. In addition, in some cases, it is required to positively reduce the printing concentration of each color image because of the service object of the printing matter.

As a method of suppressing the consumption of toner, it is considered to reduce the powers of exposure beams used in the above printing units by a constant amount, for example. However, in this case, the color balance of the color image cannot be maintained and the contrast is liable to be lowered. Particularly, a yellow portion tends to be blurred and the image of this portion becomes unclear. That is, the image cannot be lightly printed without degrading the printing quality.

SUMMARY OF THE INVENTION

An object of this invention is to provide a color printer capable of easily saving toner without significantly degrading the printing quality.

The above object can be attained by a color printer which comprises an electrophotographic process unit, having at least one photosensitive member, for selectively exposing the photosensitive member to form identical latent images thereon, developing the latent images as toner images by supplying toners of different colors, and transferring the toner images onto paper; and a control circuit for controlling amounts of exposure of the latent images to be formed by the electrophotographic process unit; wherein the control circuit includes a toner-save mode selecting section for selecting a toner-save mode, and toner-save processing circuit for lowering the exposure amounts of the latent images in the toner-save mode, while changing a rate of the exposure amounts to compensate for a difference between development properties of the toners.

In the above color printer, the toner-save mode selecting section selects a toner-save mode, and the toner-save processing circuit lowers amounts of exposure of the latent images in the toner-save mode, while changing a rate of the exposure amounts to compensate for a difference between the development properties of the toners. That is, even when the toner consumption is suppressed in the toner-save mode, a rate of the exposure amounts of the latent images is changed to compensate for a difference between the development properties of the toners, which define the concentrations and color stimuli of the toner images. Therefore, the color balance is maintained and the contrast is prevented from being lowered. Accordingly, toner can be easily saved without significantly degrading the printing quality.

Additional objects and advantages of the invention will be set forth in the description which follows, and in part will be obvious from the description, or may be learned by practice of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

There will now be described a color printer according to an embodiment of this invention with reference to the accompanying drawings.

Figure 1:
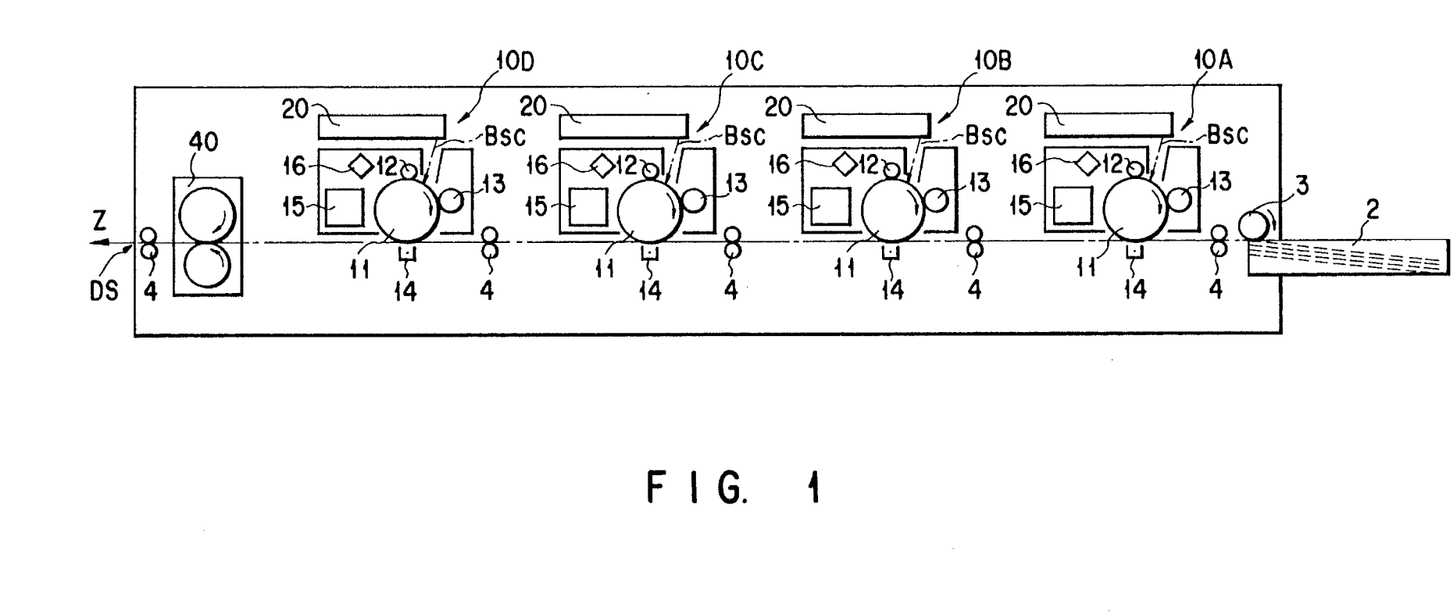
FIG. 1 is a cross sectional view schematically showing the structure of a color printer according to a first embodiment of this invention.

FIG. 1 schematically shows the structure of the color printer. The color printer includes a printer cabinet 1, a paper feeding cassette 2 removably attached to the side surface of the cabinet 1, a pickup roller 3 for taking out paper from the paper feeding cassette 2, and a paper feeding path PH for receiving the paper taken out by the pickup roller 3. The paper feeding path PH extends to a discharging port DS formed on the opposite side surface of the cabinet 1. The color printer further includes an electrophotographic process unit constituted by plural sets of feeding rollers 4 and printing units 10A to 10D which are arranged on the paper feeding path PH. The feeding rollers 4 feed the paper along the paper feeding path PH, and the printing units 10A to 10D print identical images in different colors of yellow, cyan, magenta and black by the electrophotographic process. Further, the color printer has a fixing unit 40 provided on the paper feeding path in position near the paper discharging port DS.

Each of the printing units 10A to 10D includes an image carrier 11 constructed by a photosensitive drum rotating at a constant speed in a clockwise direction corresponding to the paper feeding direction Z, and a charging section 12, exposing section 20, developing section 13, transferring section 14, toner collector 15 and discharging lamp 16 which are arranged around the image carrier 11 to effect the electrophotographic process. The charging section 12 uniformly charges the image carrier 11 with a preset potential of −500 V, for example, by use of the charging roller. The exposing section 20 scans the charged surface of the image carrier 11 by an exposure beam Bsc in the main scanning direction which is parallel to the axis of the image carrier 11. The exposure beam Bsc selectively exposes the charged surface of the image carrier 11 to create an electrostatic latent image in which the potential of the exposed position is set at −50 V. The developing section 13 supplies toner of a corresponding color to the surface area of the image carrier 11 corresponding to the electrostatic latent image by use of a developing roller so as to develop the electrostatic latent image as a toner image. The transfer section 14 transfers the toner image onto the paper fed along the paper feeding path PH by the feeding rollers 4. The toner collector 15 collects unnecessary toner left behind on the image carrier 11 after the image transferring process. The discharging lamp 16 eliminates unnecessary charges left behind on the image carrier 11 after they have passed the toner collector 15.

With the above color printer, when a sheet of paper is taken out from the paper feeding cassette 2 by the pickup roller 3, the paper is fed along the paper feeding path PH by the feeding rollers 4 and then sequentially supplied to the printing units 10A to 10D. Each of the printing units 10A to 10D transfers the toner image onto the same area of the paper supplied thereto. The fixing unit 40 thermally fixes the toner images of yellow Y, cyan C, magenta M and black BK transferred on the same area of the paper by the respective printing units 10A to 10D on the paper to create a combined color image.

The printing units 10A to 10D are formed with the same structure and perform the printing process on the same process condition so as not to cause a variation in the printing quality. For this reason, the charging voltages are set substantially the same values in the printing units 10A to 10D as explained in the "Description of the Related Art". Further, as the toners of different colors, materials capable of permitting a sharpest color image to be produced on the above process condition are previously selected.

Figure 2:
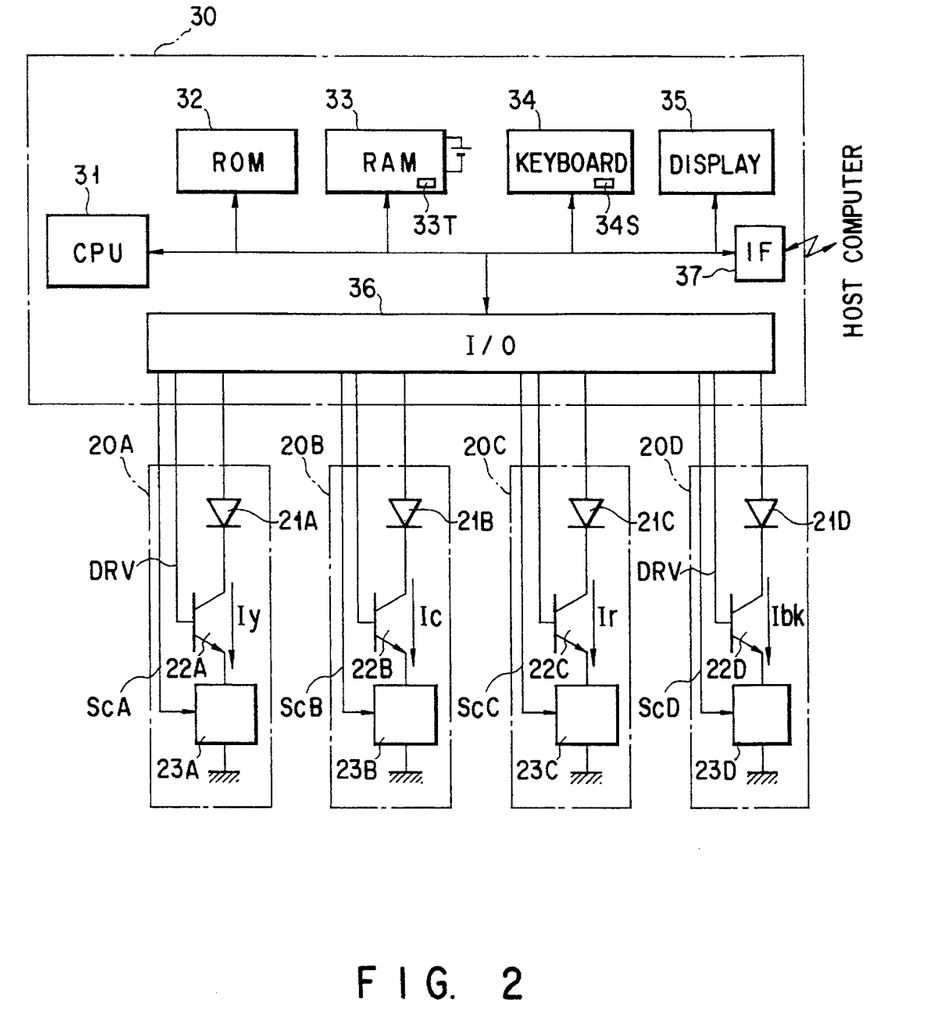
FIG. 2 is block diagram showing a control circuit of the color printer shown in FIG. 1.

The color printer further includes a control circuit 30 shown in FIG. 2. The control circuit 30 includes a CPU 31 for controlling all of the circuit components, a ROM 32 for storing fixed data such as a control program of the CPU 31, a RAM 33 for temporarily storing data input to or output from the CPU 31, a keyboard 34 for inputting various control instructions, a display 35 for displaying the state of the color printer, an input and output port 36 connected to the components shown in FIG. 1, and a communication interface 37 connected to a host computer. The keyboard 34 includes a toner-save key 34S for selecting the toner-save mode. Since the components except the exposing section 20 are controlled by a method which is known in the art, they are omitted in FIG. 2. Reference numerals 20A to 20D in FIG. 2 denote exposing sections of the printing units 10A to 10D.

The exposing sections 20A to 20D respectively include series circuits of semiconductor laser devices 21A to 21D, switching elements 22A to 22D, and driving current changing circuits 23A to 23D. The semiconductor laser devices 21A to 21D are light sources for emitting laser beams as the exposure beam Bsc. The switching elements 22A to 22D are transistors which are turned on and off by the respective drive control signals DRV. The driving current changing circuits 23A to 23D change the driving currents of the semiconductor laser devices 21A to 21D according to current setting signals ScA, ScB, ScC and ScD. The semiconductor laser device 21A emits the exposure beam Bsc of output power corresponding to a driving current I1 set by the driving current changing circuit 23A, the semiconductor laser device 21B emits the exposure beam Bsc of output power corresponding to a driving current I2 set by the driving current changing circuit 23B, the semiconductor laser device 21C emits the exposure beam Bsc of output power corresponding to a driving current I3 set by the driving current changing circuit 23C, and the semiconductor laser device 21D emits the exposure beam Bsc of output power corresponding to a driving current I4 set by the driving current changing circuit 23D. Each of the exposing sections 20A to 20D further includes a scanning optical system such as a polygon mirror, reflection mirror, and the like, but the optical system is known in the art and is omitted in FIG. 2.

Figure 3:
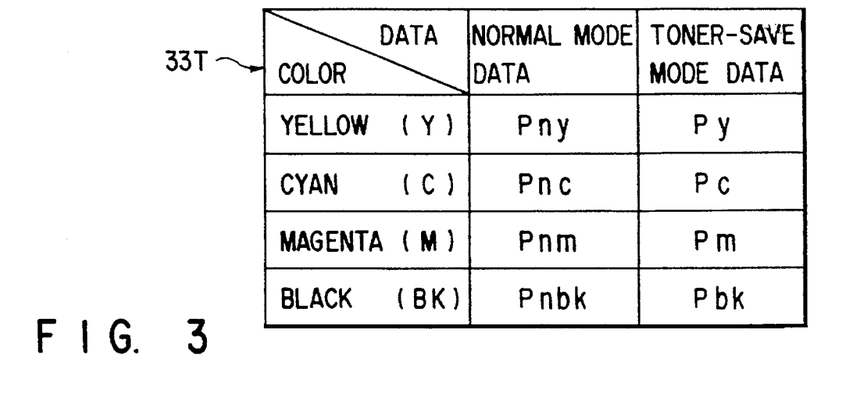
FIG. 3 is a diagram showing a data table stored in a RAM shown in FIG. 2.
Figure 4A:
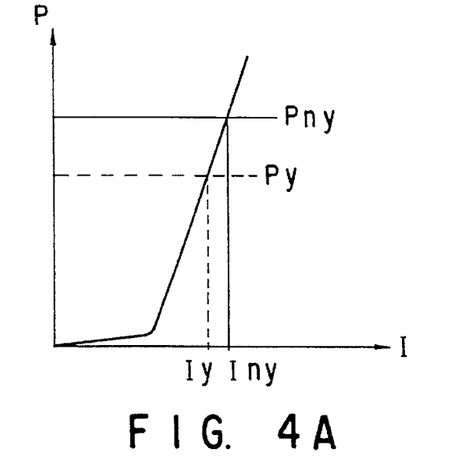
FIGS. 4A to 4D are graphs respectively showing the relations between the powers of exposure beams emitted from the semiconductor laser devices disposed in the respective exposing sections of yellow, cyan, magenta and black shown in FIG. 2 and the driving currents thereof.
Figure 4B:
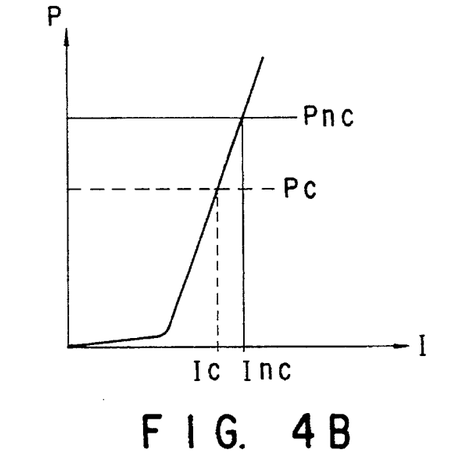
Figure 4C:
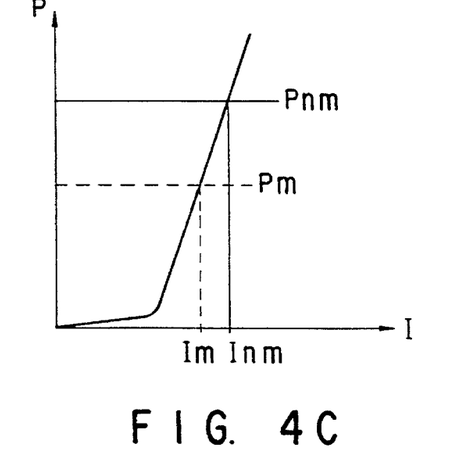
Figure 4D:
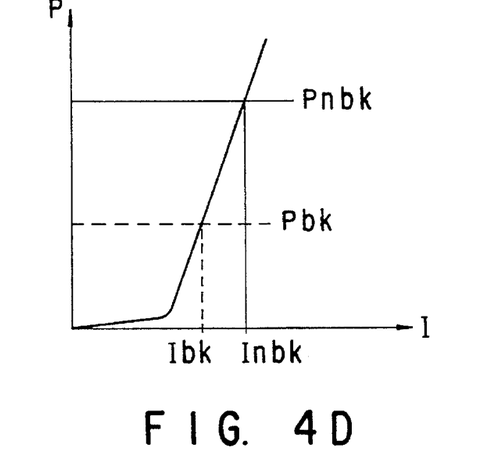

The RAM 33 has a battery backed-up area which continuously holds a data table 33T constructed by normal mode data and toner-save mode data as shown in FIG. 3. The normal mode data specifies the power levels of exposure beams Bsc emitted from the semiconductor laser devices 21A to 21D of the exposing sections 20A to 20D for yellow Y, cyan C, magenta M and black BK to Pny, Pnc, Pnm and Pnbk and the toner-save mode data specifies the power levels of exposure beams Bsc emitted from the semiconductor laser devices 21A to 21D of the exposing sections 20A to 20D for yellow Y, cyan C, magenta M and black BK to Py, Pc, Pm and Pbk in the toner-save mode. The power levels Pny, Pnc, Pnm, Pnbk of the exposure beams Bsc are substantially at the same level as shown in FIGS. 4A to 4D. On the other hand, the power levels Py, Pc, Pm, Pbk of the exposure beams Bsc are set at levels lower than the respective power levels Pny, Pnc, Pnm, Pnbk as shown in FIGS. 4A to 4D. The above setting of the power levels is made to reduce the amounts of toners of yellow Y, cyan C, magenta M and black BK attached to the image carriers 11 according to the electrostatic latent images, thereby lowering the concentrations of the printed images of these colors. Further, the power levels Py, Pc, Pm, Pbk are so set as to satisfy the relation of Py>Pc>Pm>Pbk. The relation is so set as to make the color stimuli of the respective toners uniform when the concentrations of the printed images are lowered. Further, a difference between the development properties of the respective toners can be compensated for by setting the power levels of exposure beams Bsc emitted from the semiconductor laser devices 21A to 21D to different levels.

Figure 5:
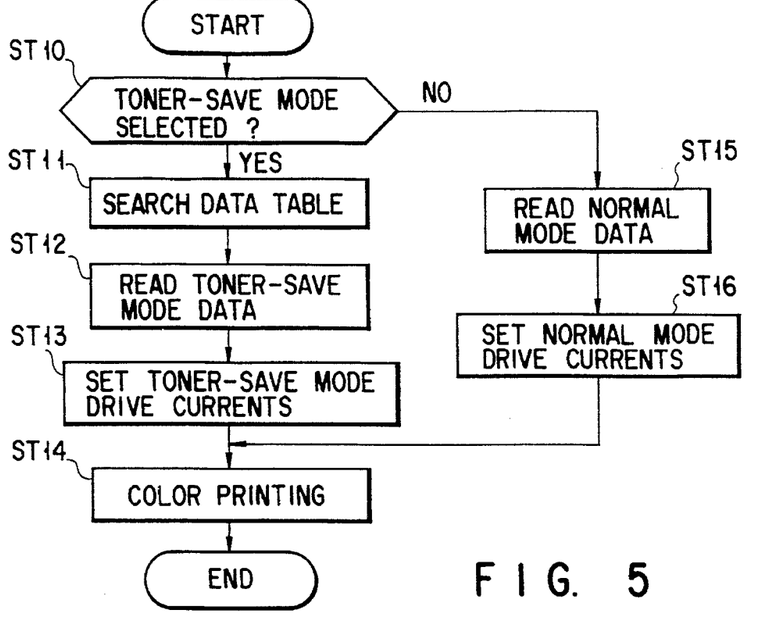
FIG. 5 is a flowchart for illustrating an operation of the control circuit shown in FIG. 2.

FIG. 5 shows a control operation of the control circuit 30. When the control operation is started, whether the toner-save mode is selected by the toner-save key 34S or not is checked in the step ST10. If the toner-save mode is not selected, the normal mode is set in the step ST15 and normal mode data is read out from the data table 33T. In the step ST16, the driving current changing circuits 23A to 23D respectively set the driving currents I1, I2, I3 and I4 of the semiconductor laser devices 21A to 221D to the levels of Iny, Inc, Inm and Inbk by the control of current setting signals ScA, ScB, ScC and ScD corresponding to the readout normal mode data. The power levels of the exposure beams Bsc from the semiconductor laser devices 21A to 21D are set to Pny, Pnc, Pnm and Pnbk corresponding to the driving currents I1, I2, I3 and I4. After this, the color printing process is effected in the step ST14.

On the other hand, if the toner-save mode is selected, the toner-save mode is set in the step ST11 and toner-save mode data is searched for in the data table 33T. Then, the toner-save mode data is read out from the data table 33T in the step ST12. In the step ST13, the driving current changing circuits 23A to 23D set the driving currents I1, I2, I3 and I4 of the semiconductor laser devices 21A to 21D to the levels of Iy, Ic, Im and Ibk by the control of current setting signals ScA, ScB, ScC and ScD corresponding to the readout toner-save mode data. The power levels of the exposure beams Bsc from the semiconductor laser devices 21A to 21D are set to Py, Pc, Pm and Pbk corresponding to the driving currents I1, I2, I3 and I4. After this, the color printing process is performed in the step ST14.

In the above color printer, the power levels of the exposure beams Bsc from the semiconductor laser devices 21A to 21D are set to the levels of Py, Pc, Pm and Pbk in the toner-save mode and the levels are lower than the levels of Pny, Pnc, Pnm and Pnbk set in the normal mode. Therefore, in each of the printing units 10A to 10D, the exposing section 20 creates an electrostatic latent image applied with an amount of exposure light less than that in the normal mode on the image carrier 11. The electrostatic latent image is developed by use of toner of an amount less than that in the normal mode in the developing section 13. The thus obtained toner image is transferred from the image carrier 11 onto the paper in the transferring section 14. When images of yellow Y, cyan C, magenta M and black BK are transferred to the paper by the respective printing units 10A to 10D, the images are thermally fixed on the paper by the fixing unit 40. The concentration of the thus obtained color image becomes lower than that of the color image in the normal mode, but the amount of toner used in the toner-save mode can be suppressed in comparison with that used in the normal mode. Further, in the toner-save mode, the power levels of the exposure beams Bsc from the semiconductor laser devices 21A to 21D are set in the relation of Py>Pc>Pm>Pbk and are different from each other. The color stimuli of yellow Y, cyan C, magenta M and black BK are set in the relation of Y<C<M<BK and the amount of usage of toner of a color having a stronger color stimulus is set to a smaller value. That is, since the power levels of Py, Pc, Pm, Pbk are so selected as to compensate for a difference between the development properties of the toners of yellow Y, cyan C, magenta M and black BK actually used, the color balance is maintained and the contrast can be kept high in the toner-save mode. Therefore, for example, a yellow portion will not be blurred and the image of this portion will not be made unclear so that an extremely clearly visible image can be obtained. Further, the toner-save mode can be easily selected by use of the toner-save key 34S and the operability is excellent.

In short, the control circuit 30 sets the powers of exposure beams Bsc emitted from the exposing sections 20A to 20D to preset levels in the normal mode and sets the powers of exposure beams Bsc emitted from the exposing sections 20A to 20D to levels which are lower than the preset levels and which have a relation compensating for a difference between the development properties of toners used in a plurality of printing units 10A to 10D in the toner-save mode. Thus, since the rate of the powers of exposure beams Bsc emitted from the exposing sections 20A to 20D are changed as described above even when the printing concentration is lowered in the toner-save mode, the color balance and the contrast can be maintained. Therefore, the amount of toner used can be easily suppressed without significantly degrading the printing quality.

Next, a color printer according to a second embodiment of this invention is explained. The color printer is formed with a construction similar to that in the first embodiment except the control circuit 30 shown in FIG. 6.

Figure 6:
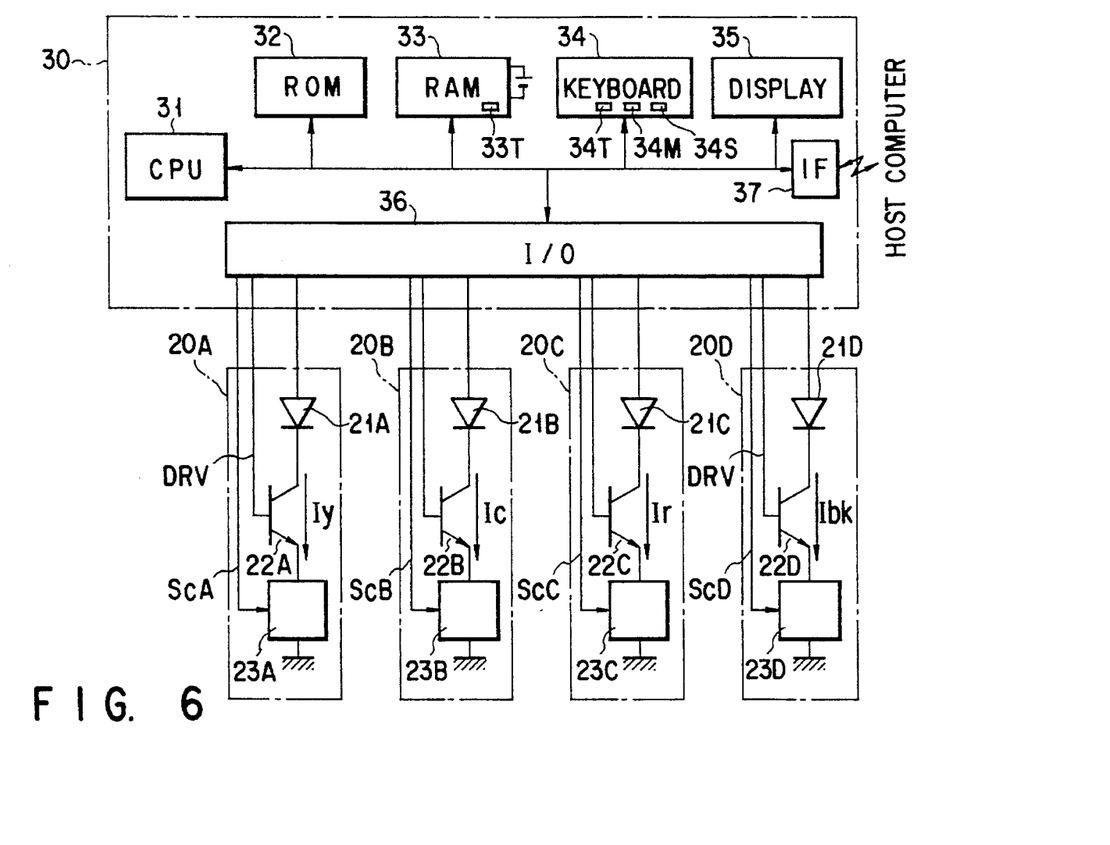
FIG. 6 is a block diagram showing a control circuit of a color printer according to a second embodiment of this invention.
Figure 7:
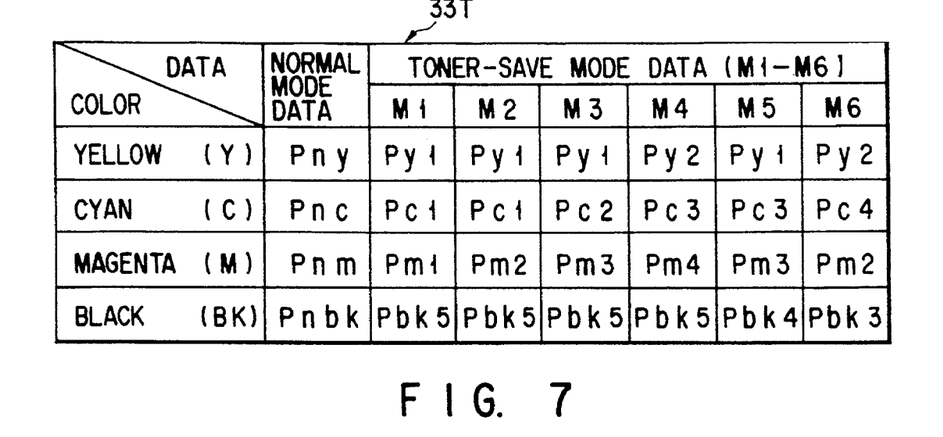
FIG. 7 is a diagram showing a data table stored in a RAM shown in FIG. 6.
Figure 8A:
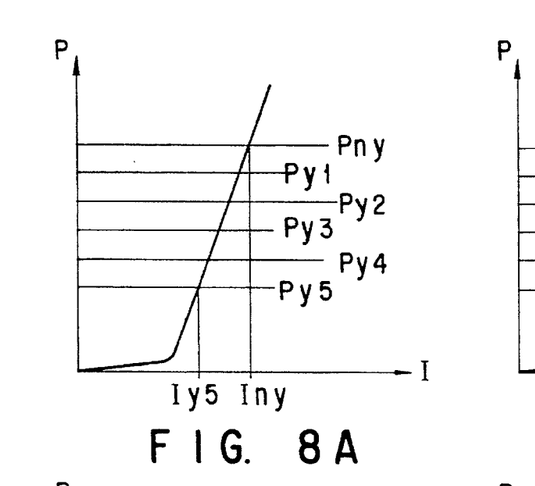
FIGS. 8A to 8D are graphs respectively showing the relations between the powers of exposure beams emitted from the semiconductor laser devices disposed in the respective exposing sections of yellow, cyan, magenta and black shown in FIG. 2 and the driving currents thereof.
Figure 8B:
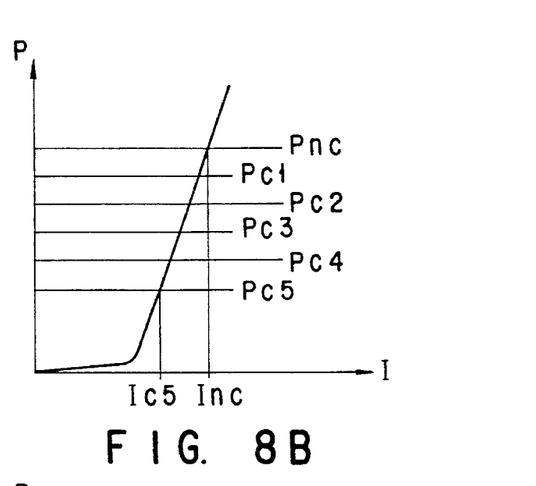
Figure 8C:
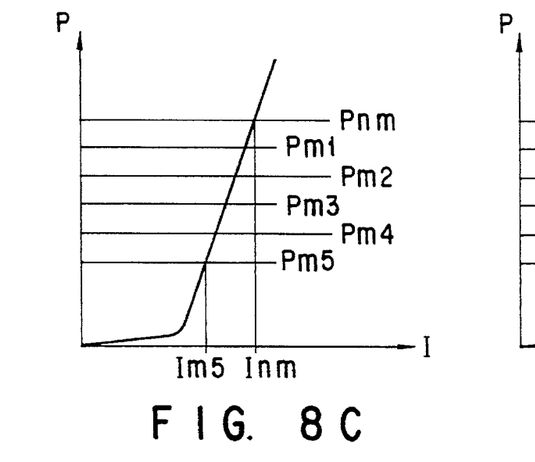
Figure 8D:
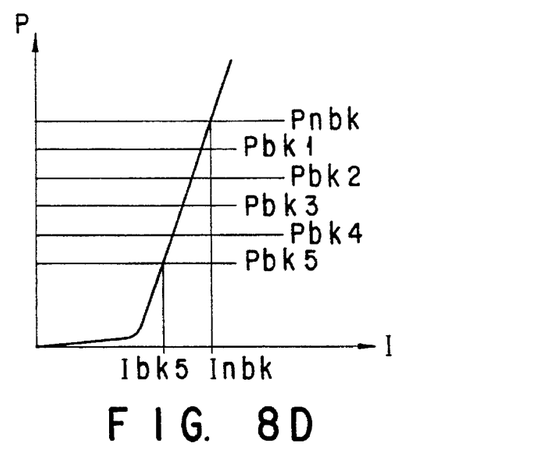

A control circuit 30 in the second embodiment includes a CPU 31 for controlling all of the circuit components, a ROM 32 for storing fixed data such as a control program of the CPU 31, a RAM 33 for temporarily storing data input to or output from the CPU 31, a keyboard 34 for inputting various control instructions, a display 35 for displaying the state of the color printer, and an input and output port 36 connected to the components shown in FIG. 1. The keyboard 34 includes a toner-save key 34S for selecting the toner-save mode, a mode selection key 34M for selecting the type of toner-save mode, and a self-test key 34T for selecting the self-test mode.

The RAM 33 has a battery backed-up area, and as shown in FIG. 3, the area continuously holds a data table 33T constructed by normal mode data and first to sixth toner-save mode data items. The normal mode data specifies the power levels of exposure beams Bsc emitted from the semiconductor laser devices 21A to 21D of the exposing sections 20A to 20D for yellow Y, cyan C, magenta M and black BK to Pny, Pnc, Pnm and Pnbk. The first toner-save mode data specifies the power levels of exposure beams Bsc emitted from the semiconductor laser devices 21A to 21D to Py1, Pc1, Pm1 and Pbk5 in the toner-save mode M1. The second toner-save mode data specifies the power levels of exposure beams Bsc emitted from the semiconductor laser devices 21A to 21D to Py1, Pc1, Pm2 and Pbk5 in the toner-save mode M2. The third toner-save mode data specifies the power levels of exposure beams Bsc emitted from the semiconductor laser devices 21A to 21D to Py1, Pc2, Pm3 and Pbk5 in the toner-save mode M3. The fourth toner-save mode data specifies the power levels of exposure beams Bsc emitted from the semiconductor laser devices 21A to 21D to Py2, Pc3, Pm4 and Pbk5 in the toner-save mode M4. The fifth toner-save mode data specifies the power levels of exposure beams Bsc emitted from the semiconductor laser devices 21A to 21D to Py1, Pc3, Pm3 and Pbk4 in the toner-save mode M5. The sixth toner-save mode data specifies the power levels of exposure beams Bsc emitted from the semiconductor laser devices 21A to 21D to Py2, Pc4, Pm2 and Pbk3 in the toner-save mode M6.

As shown in FIGS. 8A to 8D, the power levels Pny, Pnc, Pnm, Pnbk in the normal mode are set substantially at the same level. On the other hand, the power levels in the toner-save modes M1 to M6 are set at levels lower than the respective power levels Pny, Pnc, Pnm, Pnbk in the normal mode. The above setting of the power levels is made to reduce the amounts of toners of yellow Y, cyan C, magenta M and black BK attached to the image carrier 11 according to the electrostatic latent images and lower the concentrations of the printed images of these colors. Further, the power levels Py1, Pc1, Pm1, Pbk5 in the toner-save mode M1 are so set as to satisfy the relation of Py1=Pc1=Pm1>Pbk5. The power levels Py1, Pc1, Pm2, Pbk5 in the toner-save mode M2 are so set as to satisfy the relation of Py1=Pc1>Pm2>Pbk5. The power levels Py1, Pc2, Pm3, Pbk5 in the toner-save mode M3 are so set as to satisfy the relation of Py1>Pc2>Pm3>Pbk5. The power levels Py2, Pc3, Pm4, Pbk5 in the toner-save mode M4 are so set as to satisfy the relation of Py2>Pc3>Pm4>Pbk5. The power levels Py1, Pc3, Pm3, Pbk4 in the toner-save mode M5 are so set as to satisfy the relation of Py1>Pc3=Pm3>Pbk4. The power levels Py2, Pc4, Pm2, Pbk3 in the toner-save mode M6 are so set as to satisfy the relation of Py2=Pm2>Pbk3>Pc4. For example, in the toner-save mode M1, only the power of the exposure beam Bsc of black BK is specified to be significantly low. Further, in the toner-save mode M3, the power level of the exposure beam Bsc is so specified as to become lower as the color stimulus of the corresponding toner is stronger.

Figure 9:
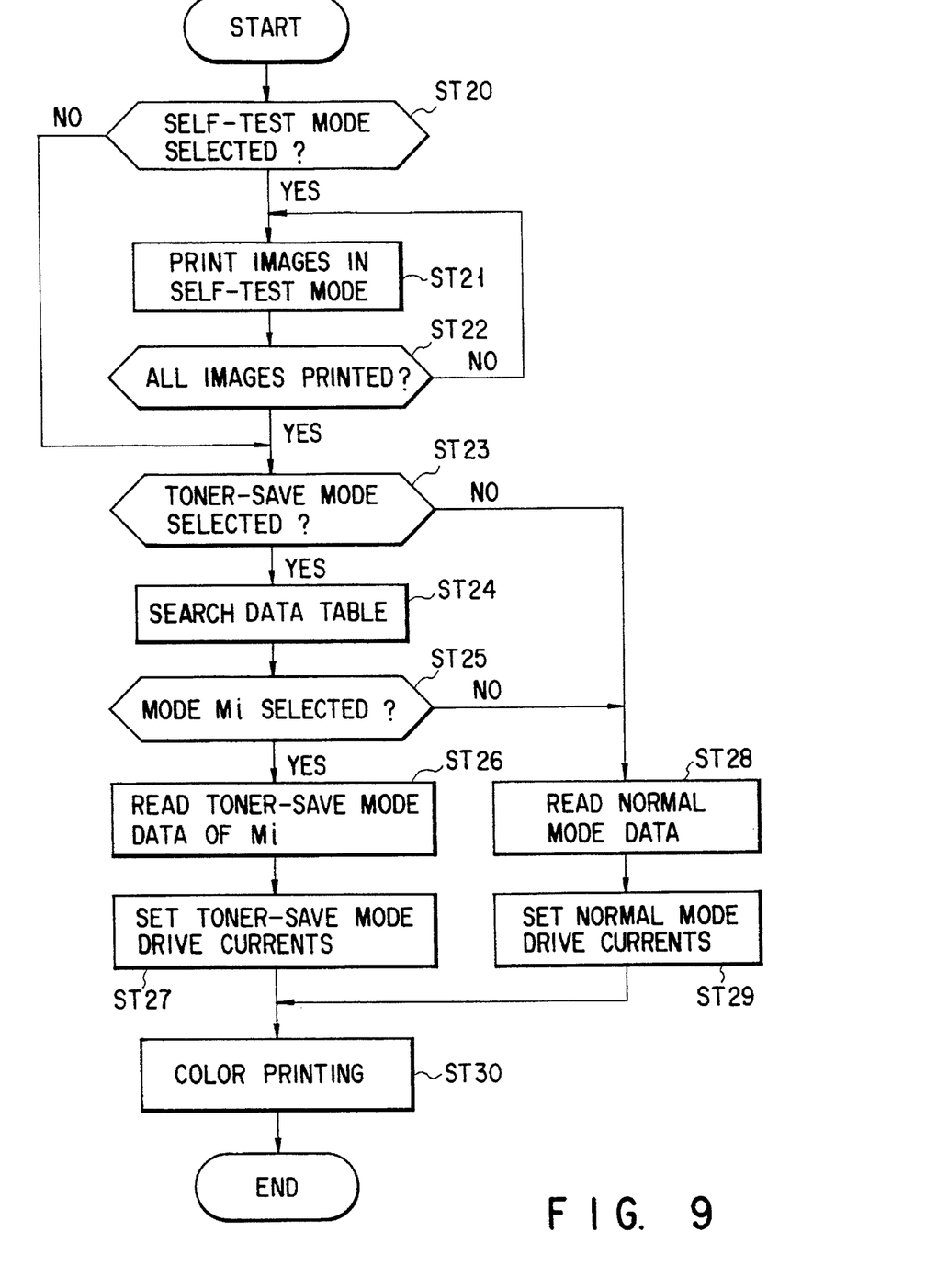
FIG. 9 is a flowchart for illustrating an operation of the control circuit shown in FIG. 6.

FIG. 9 shows a control operation of the control circuit 30. When the control operation is started, whether the self-test mode is selected by the self-test key 34T or not is checked in the step ST20. If the self-test mode is selected, one of the first to sixth toner-save mode data items is read out from the data table 33T, the semiconductor laser devices 21A to 21D are driven to emit exposure beams Bsc of powers specified by the readout toner-save mode data, and the printing units 10A to 10D are driven to print a color image of, for example, three lines on the paper in the step ST21. In the step ST22, whether all of the color images based on one of the first to sixth toner-save mode data items are printed or not is checked. If color images to be printed are present, the steps ST21 and ST22 are repeatedly executed.

If it is detected in the step ST20 that the self-test mode is not selected or if it is detected in the step ST22 that the process of printing all of the color images is completed, whether or not the toner-save mode is selected by the toner-save key 34S is checked in the step ST23. If the toner-save mode is not selected, the normal mode is set in the step ST28 and normal mode data is read out from the data table 33T. In the step ST29, the driving current changing circuits 23A to 23D set the driving currents I1, I2, I3 and I4 of the semiconductor laser devices 21A to 21D to the levels of Iny, Inc, Inm and Inbk by the control of current setting signals ScA, ScB, ScC and ScD corresponding to the readout normal mode data. The power levels of the exposure beams Bsc from the semiconductor laser devices 21A to 21D are set to Pny, Pnc, Pnm and Pnbk corresponding to the driving currents I1, I2, I3 and I4. After this, the color printing process is performed in the step ST30.

On the other hand, if the toner-save mode is selected, the toner-save mode is set in the step ST24 and toner-save mode data is searched for in the data table 33T. In the step ST25, whether one toner-save mode Mi between the toner-save modes M1 to M6 is selected by the mode selection key 34 or not is checked. If the toner-save mode is not selected, the step ST28 is executed. On the other hand, if the toner-save mode Mi is selected, toner-save mode data for Mi is read out from the data table 33T in the step ST26. In the step ST27, the driving current changing circuits 23A to 23D set the driving currents I1, I2, I3 and I4 of the semiconductor laser devices 21A to 21D by the control of current setting signals ScA, ScB, ScC and ScD corresponding to the readout toner-save mode data and the power levels of the exposure beams Bsc from the semiconductor laser devices 21A to 21D are set to Py, Pc, Pm and Pbk. After this, the color printing process is performed in the step ST30.

According to the color printer of the second embodiment, since the first to sixth toner-save mode data items are previously prepared, color images with various colors and various concentrations can be printed on the paper according to data while the total amount of toner used is reduced by use of the toner-save mode data. If the self-test mode is first selected, six types of color images are printed based on the first to sixth toner-save mode data items. As a result, the printing concentrations, color balances, contrasts and the like of the color images can be easily compared. Therefore, the operator can easily find out one color image which is adequate for the service object from the above color images and select the toner-save mode Mi corresponding to the detected color image. Thus, even if the operator is inexperienced in the operation of the color printer, he will not fail to effect the printing operation in the toner-save mode. Further, since the toner-save mode data items are stored in the data table 33T provided in one area of the RAM 33, toner-save mode data items can be easily corrected when the type of toner to be used is changed.

In FIG. 9, when one of the toner-save modes M1 to M6 is not selected by the toner-save key 34S, the color printing process is effected by use of normal mode data. However, instead of this, it is possible to use a preset one of the toner-save modes M1 to M6 in the above case.

In the second embodiment, six items of toner-save mode data are provided as examples for toner-save modes M1 to M6. Therefore, each of the toner save mode data items can be replaced by another one if the rate of the powers of the exposure beams Bsc is changed to compensated for a difference between the developing properties of the toners of different colors.

Further, in each embodiment, the color printer is arranged to include printing units 10A to 10D each formed of an image carrier 11, a charging section 12, an exposing section 20, a developing section 13, and a transferring section 14. However, the present invention is not limited to this arrangement. For example, the color printer may be arranged to include a single printing unit if the unit has four developing sections which supply toners of yellow, cyan, magenta and black, respectively. These developing sections are sequentially used to develop the same electrostatic latent image repeatedly formed by the exposing section. In this case, the number of printing units can be reduced.

Moreover, in each embodiment, the keyboard 34 has at least one key for selecting a toner-save mode. However, selection of the toner-save mode may be controlled by a command supplied from the host computer.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color printer comprising:

electrophotographic process means, having at least one photosensitive member, for selectively exposing said photosensitive member to form identical latent images thereon, developing the latent images as toner images by supplying toners of different colors, and transferring the toner images onto paper; and control means for controlling amounts of exposure of the latent images to be formed by said electrophotographic process means;

wherein said control means includes a toner-save mode selecting section for selecting a toner-save mode, and toner-save processing means for lowering the exposure amounts of the latent images in the toner-save mode, while changing a rate of the exposure amounts to compensate for a difference between development properties of the toners.

2. A color printer according to claim 1, wherein said toner-save processing means includes memory means for storing toner-save mode data specifying amounts of exposure of the latent images to be formed by said electrophotographic process means in the toner-save mode, and amount setting means for setting the exposure amounts of the latent images according to the toner-save data stored in said memory means.

3. A color printer according to claim 1, wherein said toner-save processing means includes memory means for storing items of toner-save mode data each specifying amounts of exposure of the latent images to be formed by said electrophotographic process means in the toner-save mode, a data selecting section for selecting one of the toner-save mode data items stored in said memory means, and amount setting means for setting the exposure amounts of the latent images according to the toner-save data item selected by said data selecting section.

4. A color printer according to claim 3, wherein said control means further includes a test mode selecting section for selecting a test mode, and test processing means for selecting each of the toner-save mode data items stored in said memory means, setting the exposure amounts of the latent images according to the selected toner-save mode data, and enabling a test operation of said electrophotographic process means using the set exposure amounts, to obtain images of various printing concentrations in the test mode.

5. A color printer according to claim 1, wherein said electrophotographic process means includes a plurality of printing units each of which has an image carrier serving as said photosensitive member, an exposing section for selectively exposing said image carrier with an exposure beam to form an electrostatic latent image thereon, a developing section for developing the electrostatic latent image as a toner image by supplying toner of a corresponding color, and a transferring section for transferring the toner image onto the paper.

6. A color printer according to claim 5, wherein said toner-save processing means includes memory means for storing toner-save mode data specifying powers of the exposure beams used in said printing units in the toner-save mode, and power setting means for setting the powers of the exposure beams according to the toner-save mode data stored in said memory means.

7. A color printer according to claim 6, wherein said memory means has an area for storing normal mode data specifying powers of the exposure beams used in said printing units when the toner-save mode is not selected, and power setting means for setting the powers of the exposure beams according to the normal mode data stored in the area of said memory means.

8. A color printer according to claim 5, wherein said toner-save processing means includes memory means for storing items of toner-save mode data each specifying powers of the exposure beams used in said printing units in the toner-save mode, a data selecting section for selecting one of the toner-save mode data items, and power setting means for setting the powers of the exposure beams according to the toner-save mode data selected by said data selecting section.

9. A color printer according to claim 8, wherein said control means further includes a test mode selecting section for selecting a test mode, and test processing means for selecting each of the toner-save mode data items stored in said memory means, setting the powers of the exposure beams according to the selected toner-save mode data, and enabling a test operation of said electrophotographic process means using the set powers of the exposure beams, to obtain images of various printing concentrations in the test mode.

10. A color printer according to claim 8, wherein said memory means has an area for storing normal mode data specifying powers of the exposure beams used in said printing units when the toner-save mode is not selected, and power setting means for setting the powers of the exposure beams according to the normal mode data stored in the area of said memory means.

* * * * *